United States Patent
Miyaki

(10) Patent No.: US 8,369,243 B2
(45) Date of Patent: Feb. 5, 2013

(54) MINIMIZING BANDWIDTH COSTS FOR ONLINE GAMES

(75) Inventor: Ken Miyaki, San Diego, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 398 days.

(21) Appl. No.: 12/431,236

(22) Filed: Apr. 28, 2009

(65) Prior Publication Data
US 2010/0273557 A1     Oct. 28, 2010

(51) Int. Cl.
*H04L 12/28*     (2006.01)

(52) U.S. Cl. .............. 370/254; 370/230; 379/114.06; 463/42; 705/400

(58) Field of Classification Search .................. None
See application file for complete search history.

(56) References Cited

U.S. PATENT DOCUMENTS

| | | | |
|---|---|---|---|
| 2004/0230444 A1* | 11/2004 | Holt et al. | 705/1 |
| 2009/0196516 A1* | 8/2009 | Perlman et al. | 382/239 |
| 2009/0254843 A1* | 10/2009 | Van Wie et al. | 715/757 |

* cited by examiner

*Primary Examiner* — Ayaz Sheikh
*Assistant Examiner* — Nicholas Sloms
(74) *Attorney, Agent, or Firm* — Procopio, Cory, Hargreaves & Savitch LLP

(57) ABSTRACT

Minimizing bandwidth cost for a participant in an online game, the method including: querying the game participant to determine a network service charge model; selecting a role for the game participant based on the determined network service charge model and a position of the participant in a network topology; and positioning the game participant into the selected role within the network topology of the online game.

12 Claims, 3 Drawing Sheets

MINIMIZING BANDWIDTH COSTS FOR ONLINE GAMES

BACKGROUND

1. Field of the Invention

The present invention relates to an online game, and more specifically, to a network game topology for such an online game.

2. Background

The popularity of multiplayer online games on the Internet has dramatically increased in recent years. Unlike conventional single player electronic games, multiplayer online games enable a player to participate in games with other players, either as an individual or as a team member. The multiplayer aspect of these games adds to the players' gaming experience by offering new gaming considerations, including strategy, teamwork, and rivalries.

In order to enable playing of a multiplayer online game, host services must be provided by either an individual or a third-party host. Host services are typically executed on a host computer or server that determines the participants in the game, and whether new players may be added to each game session. However, these host services typically do not take networking costs of the game participants. As the Internet economic model evolves, and the Internet Service Providers (ISPs) change the contract with their customers from a flat rate contract (which charges a flat rate based on maximum bandwidth) to a "per-byte transferred" contract (which charges a rate based on total content uploaded and downloaded), the customers are becoming more conscious of their network usage.

SUMMARY

The present invention provides for configuring an online game topology that minimizes bandwidth costs for an online game participant based on the cost model of the player's Internet service.

In one embodiment, a method for minimizing bandwidth cost for a participant in an online game is disclosed. The method including: querying the game participant to determine a network service charge model; selecting a role for the game participant based on the determined network service charge model and a position of the participant in a network topology; and positioning the game participant into the selected role within the network topology of the online game.

In another embodiment, a method for providing a networking topology that provides incentives to play an online game is disclosed. The method including: providing an online game with capability to dynamically adjust the networking topology; querying a participant of the online game to determine preference for less upstream bandwidth or less latency; selecting a role for the participant of the online game based on the determined preference and a position of the participant in the networking topology; and positioning the participant into the selected role within the networking topology of the online game.

In yet another embodiment, a system to provide incentives to play an online game is disclosed. The system including: a dynamically adjustable networking topology for the online game, wherein the game participant is queried to determine a network service charge model; and a selector configured to select a role for the game participant based on the determined network service charge model and a position of the participant in the networking topology, said selector operating to position the game participant into the selected role within the networking topology of the online game.

In a further embodiment, a computer-readable storage medium storing a computer program for minimizing bandwidth cost for a participant in an online game is disclosed. The computer program including executable instructions that cause a computer to: query the game participant to determine a network service charge model; select a role for the game participant based on the determined network service charge model and a position of the participant in a network topology; and position the game participant into the selected role within the network topology of the online game.

Other features and advantages of the present invention will become more readily apparent to those of ordinary skill in the art after reviewing the following detailed description and accompanying drawings.

DETAILED DESCRIPTION

Online gaming configurations presently do not take networking costs of game participants into consideration in deciding the role and position of the participants in a multiplayer online game. Accordingly, there is a need for an online game topology that minimizes bandwidth costs for an online game participant based on the cost model of the player's Internet service.

Certain embodiments as disclosed herein provide for methods and systems for configuring an online game topology that minimizes bandwidth costs for an online game participant based on the cost model of the player's Internet service. After reading this description it will become apparent how to implement the invention in various embodiments and applications. However, although various embodiments of the present invention will be described herein, it is understood that these embodiments are presented by way of example only, and not limitation. As such, this detailed description of various embodiments should not be construed to limit the scope or breadth of the present invention.

Figure 1:
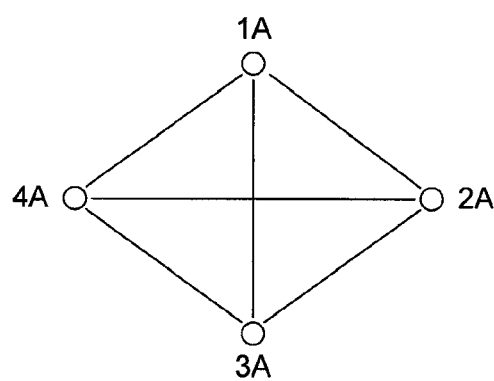
FIG. 1 shows a fully-connected grid topology for an online game.
Figure 2:
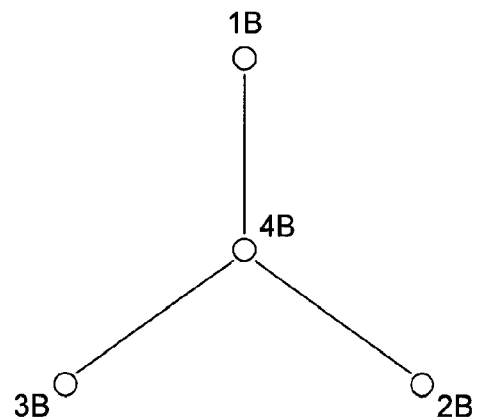
FIG. 2 shows a star network topology for an online game.
Figure 3:
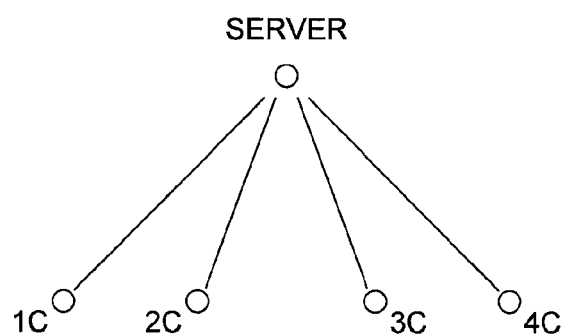
FIG. 3 shows a client-server network topology for an online game.

In one embodiment, a network game topology that minimizes bandwidth costs for an online game participant is configured to provide incentives to play a particular online game. Thus, in this embodiment, a game participant is initially queried to determine the participant's Internet service charge model, which includes a flat rate charge, a "per-byte" rate charge, and other rate charges based on combinations of the first two charges. The flat rate charge generally charges a fixed amount for unlimited usage. The "per-byte" rate charge produces a varied bill amount depending on the number of bytes uploaded and downloaded. Based on this determination (i.e., flat rate vs. "per-byte" rate) and the position of the participant in a network topology (see FIG. 1 through FIG. 3), an online gaming service can selective decide the role of the game participant in the particular online game.

For example, for a participant that is in a "per-byte" rate type ISP contract, the gaming service can select the participant for the role of a "client" in a client-server or star network topology. Thus, in the illustrated embodiment of FIG. 2, which shows a star network topology, the gaming service can select the "per-byte" rate participant as one of clients 1B, 2B, or 3B. Either the gaming service or a participant with a flat rate ISP contract can be configured as a host 4B. In the illustrated embodiment of FIG. 3, which shows a client-server network topology, the gaming service can select the "per-byte" rate participant as one of clients 1C, 2C, 3C or 4C. Again, either the gaming service or a participant with a flat rate ISP contract can be configured as a server.

In another example, for a participant that is in a flat rate type ISP contract, the gaming service can select the participant for the role of a "peer" in a fully-connected grid (where each peer is connected to every other peer in a networked game) or a "host" in a star network topology (where each peer or node in the star network is connected to other peers through the host). Thus, in the illustrated embodiment of FIG. 1, which shows a fully-connected grid, the gaming service can select the flat rate participant as one of peers 1A, 2A, 3A or 4A. In the illustrated embodiment of FIG. 2, which shows a star network topology, the gaming service can select the flat rate participant as host 4B.

In deciding the role of a participant in an online or networked game based a network topology, following issues are also considered: (1) When less upstream bandwidth that substantially reduces the amount of data being sent by a game participant is desired, the participant is placed into the role of a non-host peer in a star network topology or a client in a client-server network topology; and (2) When least latency with more upstream bandwidth is desired, a game participant who has a flat rate networking cost is sought out to be placed into the role of a peer in a fully-connect peer-to-peer grid or a host in a star network. When a game participant is placed into a role as in case (1) above, the gaming experience for the participant involves less upstream bandwidth but higher latency stemming from multi-hop network communication. When a game participant is placed into a role as in case (2) above, the gaming experience involves lower latency stemming from direct network communication but more upstream bandwidth. Thus, a "per-byte" rate game participant will benefit from the reduced networking cost. Accordingly, a gaming service provider with capability to dynamically adjust the networking topology of the online game based on the cost model of the player's Internet service will have substantial advantage over other providers in drawing the potential player to that particular online game.

Figure 4:
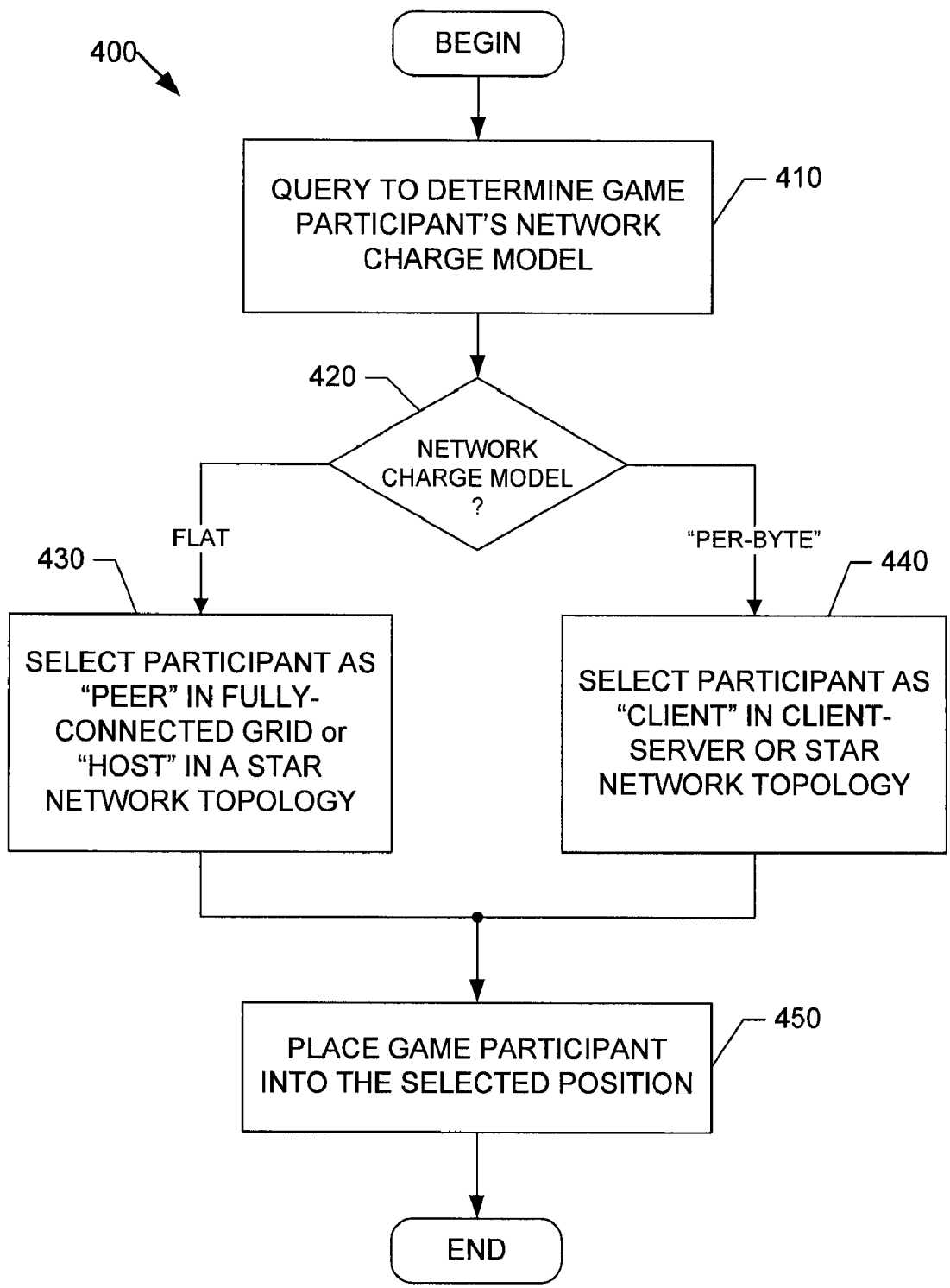
FIG. 4 is a flowchart illustrating a process for minimizing bandwidth costs for an online game participant in accordance with one embodiment of the present invention.

FIG. 4 is a flowchart 400 illustrating a process for minimizing bandwidth costs for an online game participant in accordance with one embodiment of the present invention. At boxes 410 and 420, a game participant is initially queried to determine the participant's Internet service charge model, which includes a flat rate charge, a "per-byte" rate charge, and other rate charges based on combinations of the first two charges. A role is selected for the game participant based on this determination and a position of the participant in a network topology. Thus, the participant is selected, at box 430, for the role of a "peer" in a fully-connected grid (where each peer is connected to every other peer in a networked game) or a "host" in a star network topology (where each peer or node in the star network is connected to other peers through the host) when it is determined, at box 420, that the participant is in a flat rate type ISP contract. Otherwise, the participant is selected, at box 440, for the role of a "client" in a client-server or star network topology when it is determined, at box 420, that the participant is in a "per-byte" rate type ISP contract. Then, at box 450, the game participant is placed into the selected position.

Figure 5:
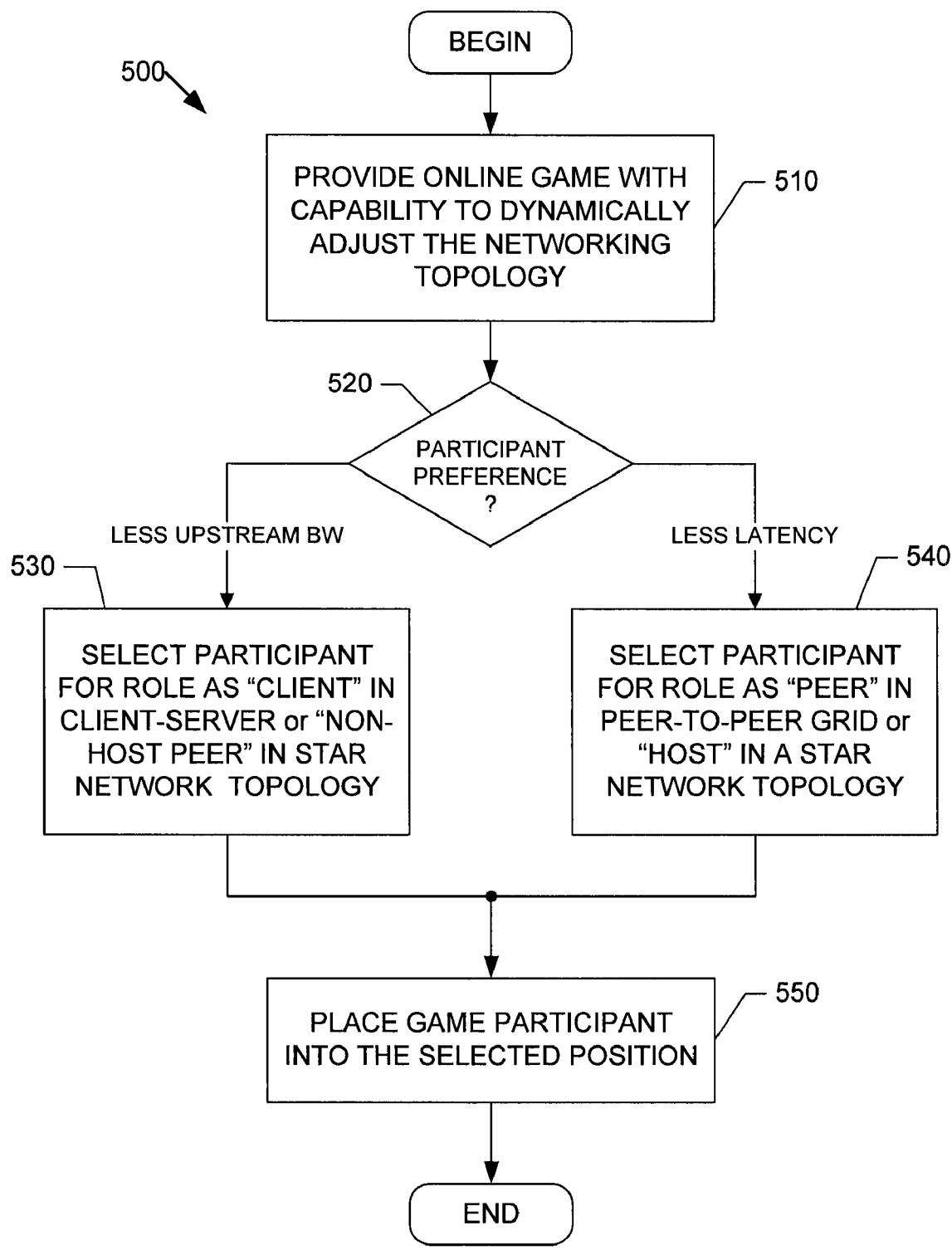
FIG. 5 is a flowchart illustrating a process for providing an online game in accordance with another embodiment of the present invention.

FIG. 5 is a flowchart 500 illustrating a process for providing an online game in accordance with another embodiment of the present invention. An online game with capability to dynamically adjust the networking topology is provided, at box 510. At box 520, a game participant is initially queried to determine the participant's preference for less upstream bandwidth or less latency. If it is determined, at box 520, that the participant's preference is for less upstream bandwidth, the participant is selected, at box 530, for the role of a "client" in a client-server topology or a "non-host peer" in a star network topology. Otherwise, if is determined, at box 520, that the participant's preference is for less latency, the participant is selected, at box 540, for the role of a "peer" in a peer-to-peer grid or a "host" in a star network topology. Then, at box 550, the game participant is placed into the selected position.

In an alternative embodiment, an enhanced network router, which serves as a primary source of all inbound and outbound packets, is configured to have information about the ISP contract of the end user. The network router, which is configured as a sole gateway to all inbound and outbound traffic to the ISP and subsequently to the Internet, provides metrics to the computer and gaming consoles (or any other network device capable of being manipulated to change the network traffic patterns) to help reduce the bandwidth, or at least, warn that certain thresholds are being reached or surpassed. Thus, for example, if the ISP contract states that a person may use up to 25 Gigabytes in one month based on the contracted rate, and network traffic above and beyond that would cause an "overage" at a premium rate (e.g., $1 per gigabyte sent or received), then the enhanced router can be configured to provide feedback to the end user if the router is: a) aware of the billing cycle; b) aware of the current date; c) able to store the data persistently in a flash drive or some other non-volatile device; d) has a guarantee of being the sole gateway to the ISP/Internet for the household (or connections subject to the ISP contract); e) aware of the ISP billing policy (e.g., 25 GB/month); and f) has some mechanism such as a "pollable" XML interface on the router, a "browsable" HTML page with the information", or an e-mail function to send alerts at certain thresholds. If an online game or computer is configured to periodically poll the router, the behavior of the game or browsing experience (and even make preference topology adjustment) can be changed to ensure that the overage is avoided (e.g., by using early warning), or that the overage is minimized (e.g., by changing the preferred topology in an online game).

Embodiments of the present invention as implemented for online games provide advantages over other games because the cost for playing the game for the end user is minimized, while maximizing the quality of the online gaming experience. The embodiments also offer advantages for the game publishers and providers in that the cost savings for the end users of the online game can be used as an incentive to provide increased sales. For example, given two substantially similar games, with one using the embodiments described herein to minimize the bandwidth and advertising that this online game will help the end user to play the game at lower cost than the competitor, the end user can be persuaded to buy this online game rather than its competitor.

The description herein of the disclosed embodiments is provided to enable any person skilled in the art to make or use the invention. Numerous modifications to these embodiments would be readily apparent to those skilled in the art, and the principals defined herein can be applied to other embodiments without departing from the spirit or scope of the invention. Thus, the invention is not intended to be limited to the embodiments shown herein but is to be accorded the widest scope consistent with the principal and novel features disclosed herein.

Various implementations of the invention are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

The invention claimed is:

1. A method for minimizing bandwidth cost for a participant in an online game, the method comprising:
    querying the game participant to determine a network service charge model, wherein the network service charge model is fee-based and includes one of a flat rate model, a per-byte rate model, and a hybrid model;
    determining a position of the participant in a network topology;
    selecting a role for the game participant based on the determined network service charge model and the position of the participant in a network topology; and
    positioning the game participant into the selected role within the network topology of the online game,
    wherein the game participant is selected for the role of a peer in a fully-connected grid when the determined network service charge model is the flat rate model,
    wherein each peer in the fully-connected grid is connected to every other peer within the network topology of the online game,
    wherein the game participant is selected for the role of a host in a star network when the determined network service charge model is the flat rate model,
    wherein each peer or node in the star network is connected to other peers through the host within the network topology of the online game.

2. The method of claim 1, wherein the game participant is selected for the role of a client in a client-server or star network when the determined network service charge model is the per-byte rate model.

3. A method for providing a networking topology that provides incentives to play an online game, the method comprising:
    providing an online game with capability to dynamically adjust the networking topology;
    querying a participant of the online game to determine preference for less upstream bandwidth or less latency within a network service charge model, wherein the network service charge model is fee-based;
    determining a position of the participant in a network topology;
    selecting a role for the participant of the online game based on the determined preference and the position of the participant in the networking topology; and
    positioning the participant into the selected role within the networking topology of the online game,
    wherein the participant is selected for the role of a client in a client-server networking topology when the participant's preference is for less upstream bandwidth, and
    wherein the participant is selected for the role of a non-host peer in a star networking topology when the participant's preference is for less upstream bandwidth.

4. The method of claim 3, wherein the game participant is selected for the role of a peer in a peer-to-peer grid networking topology when the participant's preference is for less latency.

5. The method of claim 3, wherein the game participant is selected for the role of a host in a star networking topology when the participant's preference is for less latency.

6. A system to provide incentives to play an online game, the system comprising:
    a dynamically adjustable networking topology for the online game,
    wherein a game participant is queried to determine a network service charge model, further wherein the network service charge model is fee-based and includes one of a flat rate model, a per-byte rate model, and a hybrid model; and
    wherein a position of the participant in a network topology is determined;
    a selector configured to select a role for the game participant based on the determined network service charge model and the position of the participant in the networking topology, said selector operating to position the game participant into the selected role within the networking topology of the online game, wherein the network service charge model includes one of a flat rate model, a per-byte rate model, and a hybrid model, wherein said selector selects the game participant for the role of a peer in a fully-connected grid when the determined network service charge model is the flat rate model, wherein each peer in the fully-connected grid is connected to every other peer within the networking topology of the online game, wherein said selector selects the game participant for the role of a host in a star network when the determined network service charge model is the flat rate model, and wherein each peer or node in the star network is connected to other peers through the host within the networking topology of the online game.

7. The system of claim 6, wherein said selector selects the game participant for the role of a client in a client-server or star network when the determined network service charge model is the per-byte rate model.

8. The system of claim 6, further comprising
a network router configured to serves as a primary source of inbound and outbound packets, said network router having information about the network service charge model of the game participant.

9. The system of claim 8, wherein said network router provides metrics to the selector to help reduce the bandwidth.

10. The system of claim 9, wherein the metrics warn that certain thresholds are being reached or surpassed.

11. A non-transitory computer-readable storage medium storing a computer program for minimizing bandwidth cost for a participant in an online game, the computer program comprising executable instructions that cause a computer to:

query the game participant to determine a network service charge model, wherein the network service charge model is fee-based;

determine a position of the participant in a network topology;

select a role for the game participant based on the determined network service charge model and the position of the participant in a network topology; and position the game participant into the selected role within the network topology of the online game, wherein the game participant is selected for the role of a peer in a fully-connected grid when the determined network service charge model is the flat rate model, wherein each peer in the fully-connected grid is connected to every other peer within the network topology of the online game, wherein the game participant is selected for the role of a host in a star network when the determined network service charge model is the flat rate model, wherein each peer or node in the star network is connected to other peers through the host within the network topology of the online game.

12. The storage medium of claim 11, wherein executable instructions that cause a computer to select a role for the game participant comprise executable instructions that cause a computer to
select the game participant for the role of a client in a client-server or star network when
the determined network service charge model is a per-byte rate model.

* * * * *